US009410647B2

(12) United States Patent
Steen et al.

(10) Patent No.: US 9,410,647 B2
(45) Date of Patent: Aug. 9, 2016

(54) ANTI-ROTATION SYSTEM FOR BOX AND PIN CONNECTION

(71) Applicant: Vetco Gray Inc., Houston, TX (US)

(72) Inventors: Thomas Lowell Steen, The Woodlands, TX (US); Joseph William Pallini, Tomball, TX (US); Daniel Caleb Benson, Spring, TX (US); David Lawrence Ford, Houston, TX (US); Kevin Edward O'Dell, Katy, TX (US); Stephen David Peters, Houston, TX (US); William Rey Patterson, Jr., Houston, TX (US)

(73) Assignee: Vetco Gray Inc., Houston, TX (US)

( * ) Notice: Subject to any disclaimer, the term of this patent is extended or adjusted under 35 U.S.C. 154(b) by 377 days.

(21) Appl. No.: 13/956,563

(22) Filed: Aug. 1, 2013

(65) Prior Publication Data
US 2014/0103645 A1    Apr. 17, 2014

Related U.S. Application Data

(60) Provisional application No. 61/713,313, filed on Oct. 12, 2012.

(51) Int. Cl.
*F16L 15/08* (2006.01)
*E21B 17/043* (2006.01)
*F16B 1/02* (2006.01)
*F16B 21/20* (2006.01)
*F16B 39/282* (2006.01)

(52) U.S. Cl.
CPC ............... *F16L 15/08* (2013.01); *E21B 17/043* (2013.01); *F16B 1/02* (2013.01); *F16B 21/20* (2013.01); *F16B 39/282* (2013.01)

(58) Field of Classification Search
CPC ................................ E21B 17/043; F16L 15/08
USPC ............................................................ 285/92
See application file for complete search history.

(56) References Cited

U.S. PATENT DOCUMENTS

| 1,668,921 | A | * | 5/1928 | Miks | E21B 17/043 285/90 |
|---|---|---|---|---|---|
| 3,608,933 | A | * | 9/1971 | Lee | E21B 17/043 285/89 |
| 4,406,485 | A | * | 9/1983 | Giebeler | E21B 33/13 285/92 |
| 4,711,471 | A | | 12/1987 | Pallini, Jr. et al. | |
| 4,757,593 | A | | 7/1988 | Pallini, Jr. et al. | |
| 4,900,066 | A | | 2/1990 | Brammer et al. | |
| 4,902,047 | A | * | 2/1990 | Marietta | F16L 15/08 285/92 |
| 5,044,676 | A | | 9/1991 | Burton et al. | |
| 5,050,691 | A | * | 9/1991 | Moses | E21B 17/043 285/92 |
| 6,619,392 | B2 | | 9/2003 | Marangoni et al. | |

(Continued)

FOREIGN PATENT DOCUMENTS

GB    2087022 A  *  5/1982  ............. E02D 5/523

*Primary Examiner* — David E Bochna
(74) *Attorney, Agent, or Firm* — Bracewell LLP; James E. Bradley

(57) ABSTRACT

An anti-rotation system for use in retaining a threaded connection between a pin and a box. The anti-rotation system includes a key that sets in a recess formed in one of the box or pin. The key is selectively in contact with one of the other of the box or pin, and is activated when the threaded connection begins to decouple. The key is profiled and operates in a cam like fashion to wedge itself between the box and pin when these members begin to decouple and prevents further relative rotation.

20 Claims, 13 Drawing Sheets

(56) References Cited

U.S. PATENT DOCUMENTS

| | | |
|---|---|---|
| 6,695,059 B2 | 2/2004 | Thomas et al. |
| 7,146,704 B2 | 12/2006 | Otten et al. |
| 8,690,200 B1 * | 4/2014 | Patterson, Jr. ......... E21B 17/043 285/92 |
| 8,950,785 B2 * | 2/2015 | Raynal ................. E21B 17/043 285/92 |
| 2005/0258640 A1 * | 11/2005 | Otten ...................... F16L 15/08 285/92 |
| 2011/0260445 A1 | 10/2011 | Watterson, II et al. |
| 2012/0103625 A1 | 5/2012 | Yates |
| 2014/0103645 A1 * | 4/2014 | Steen ...................... F16L 15/08 285/330 |
| 2014/0167408 A1 * | 6/2014 | Steen ...................... F16L 15/08 285/330 |

\* cited by examiner

ANTI-ROTATION SYSTEM FOR BOX AND PIN CONNECTION

CROSS REFERENCE TO RELATED APPLICATIONS

This application claims priority to and the benefit of U.S. Provisional Application Ser. No. 61/713,313, filed. Oct. 12, 2012, the hill disclosure of which is hereby incorporated by reference herein for all purposes.

BACKGROUND OF THE INVENTION

1. Field of the Invention

This invention relates in general to production of oil and gas wells, and in particular to a system for maintaining a threaded connection between tubulars.

2. Description of the Related Art

Oil and gas wells typically include tubular strings that extend into the well in conjunction with drilling, casing, and production operations. The strings are made up as they are inserted into the well by using connectors to join discrete segments of pipe. Pipe connectors usually include a male portion having one end that connects to a pipe segment, and an opposite end with male threads, which is referred to as a pin. Connectors also include a female portion, which has an end to another pipe segment, and an opposite end with female threads, which is commonly referred to as a box. Thus threading the box into the pin couples together the pipe segments. Once the pipe segments are joined, relative rotation between the male and female connectors is limited to ensure they remain firmly attached. Locking systems are sometimes employed for limiting circumferential movement between male and female connectors.

Some known locking systems include keys that insert into corresponding grooves in the pin and the box that align when the pin and the box are threaded together. However, because proper sealing requires fully torqueing the pipe connectors, manufacturing tolerances and variances in loading negatively affect repeatability of azimuthal alignment of adjacent connectors. Additionally, some threaded connectors have small overall wall thickness (e.g., subsea drill pipe and casing), thereby requiring a key that is low profile. Furthermore, space limitations prohibit use of some keys that require large devices to drive locking pins or keys into place.

SUMMARY OF THE INVENTION

Disclosed herein is a system and method for preventing decoupling of threaded tubulars. In an example an anti-rotation system for use in retaining a threaded connection between first and second tubulars is provided that includes a recess in a side of the first tubular adjacent the second tubular and a generally planar key mounted in the recess. In this example the key is rotatable between an unlocked and a locked position in response to relative rotation between the first and second tubulars in a decoupling direction. The key has a non-circular perimeter and an outer edge on a portion of the perimeter in contact with a radial surface of the second tubular when the key is in the locked position and when the key is in the unlocked position. The key also includes a lateral edge on a portion of the perimeter that in interfering contact with a side wall in the recess when the key is in the locked position. Thus when the first and second tubulars rotate in the decoupling direction a resistive force from the side wall to the lateral edge transfers to the second tubular to rotationally couple the first and second tubulars. The first tubular can be a pin and the second tubular can be a box, or vice-versa. A fastener may be included that inserts through a bore in the key for rotationally pinning the key to the first tubular. In this example, a loading element is selectively inserted adjacent the key for setting the key into an engaging orientation with the second tubular. An inner lateral edge of the key adjacent the loading can include a profile that angles outward from the perimeter with distance from an outer radius of the first tubular, and that is in interfering contact with the loading element when the loading element is inserted adjacent the key and rotates the key into an orientation where the outer edge is in contact with the radial surface of the second tubular. Optionally, the loading element inserts into a bore that is formed tangentially through a sidewall of the first tubular. In an example, the outer edge includes teeth that project outward from the key and bite into the radial surface of the second tubular and transfer the decoupling force to the second tubular. The key can have a cam like outer periphery. In one embodiment, the key has a bore offset from a middle of the key, has a generally elongate body extending transverse to the bore, wherein the outer edge is on a lower edge of the body, and wherein teeth are on formed on the lower edge for engaging the radial surface. The lateral edge can be spaced from the side wall when the key is in the unlocked position. In an alternate embodiment, the lateral edge and side wall are complimentary in profile, and are in contact when the key is in the unlocked position and when the key is in the locked position.

Also included herein is a method of retaining a threaded connection between a first tubular and a second tubular. In one embodiment the method includes providing a generally planar key having a perimeter with a variable radius, pinning the key in a recess formed along a portion of a circumference of the first tubular that is adjacent the second tubular. In this example the key is rotatable about an axis that is generally radial with respect to the first tubular. The method also includes setting the key so that an outer edge of the key is in contact with a radial surface of the second tubular, and so that when one of the first or second tubulars rotate in a decoupling direction, contact between the outer edge of the key and radial surface of the second tubular generates a force that resists further decoupling of the first and second tubular. A lateral edge of the key can be rotated into interfering contact with a sidewall of the recess to generate the resistive force. In one example, the first tubular is a pin and the second tubular is a box. The step of setting the key may include inserting a loading element in the recess adjacent the key that interferes with the key and rotates the key into contact with the radial surface. Optionally, setting the key involves inserting a loading element in a slot that is tangentially formed on the first tubular, and which interferes with the key to rotate the key into contact with the radial surface. In an alternative, the resistive force exerts tension in the key.

Also disclosed herein is an anti-rotation system for use in retaining a threaded connection between first and second tubulars, which includes a generally planar key that has a perimeter with a varying radius and that is selectively rotatable into a set position and into a locked configuration. A fastener extends in a direction that is generally radial with the first tubular and that is for pinning the key in a recess formed an outer surface of the first tubular. An outer edge is provided on a portion of the perimeter of the key that is urged into contact with a radial surface of the second tubular when the key is in the set position, and so that when at least a one of the first and second tubulars rotate in a decoupling direction, contact between the outer edge and second tubular rotates the key into a locked configuration that generates a force to oppose decoupling of the first and second tubulars. In one example, a portion of the perimeter has an oval shape. A loading element for rotating the key into the set position can also be included.

BRIEF DESCRIPTION OF DRAWINGS

Some of the features and benefits of the present invention having been stated, others will become apparent as the description proceeds when taken in conjunction with the accompanying drawings, in which.

Figure 1:
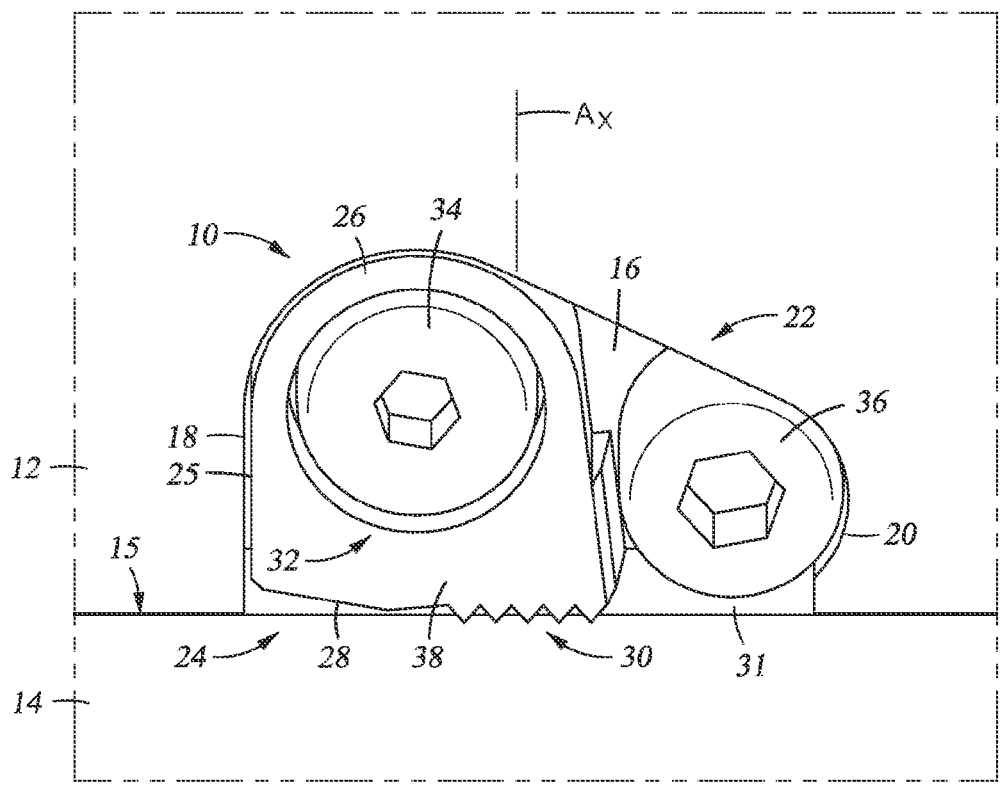
FIG. 1 is a perspective view of an example embodiment of an anti-rotation system for tubular connectors and in accordance with the present invention.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art, in the drawings and specification, there have been disclosed illustrative embodiments and, although specific terms are employed, they are used in a generic and descriptive sense only and not for the purpose of limitation.

Shown in a perspective view in FIG. 1 is one example of an anti-rotation assembly 10 for maintaining a threaded connection between tubulars. In the example of FIG. 1 the tubulars threadingly connected together include a pin 12 and box 14; where the pin 12 has an end (not shown) with a threaded outer surface that threadingly connects to a threaded inner surface (not shown) in the box 14. The threaded end of the pin 12 extends into the box 14 and past an interface 15 between outer surfaces of the pin 12 and box 14. A recess 16 is shown formed on an outer surface of the pin 12, and circumscribing a portion of the pin 12 adjacent the interface 15. A lateral side 18 or wall in an end of the recess 16 is normal with interface 15 and generally parallel with an axis $A_X$ of the pin 12 and box 14. A lateral side 20 on an end the recess 16 distal from lateral side 18 is shown having a curved profile that is concave like with respect to lateral side 18. The terminal ends of the lateral sides 18, 20 distal from the interface 15 are connected by an upper side 22 that slants obliquely away from interface 15 with distance from lateral side 20. The upper side 22 of FIG. 1 is generally straight proximate opposing lateral side 20, proximate to lateral side 18, upper side 22 curves towards interface 15. Thus the periphery of the recess 16 is generally curved proximate where lateral side 18 and upper side 22 join.

An example embodiment of a key 24 is shown occupying a portion of the recess 16 adjacent lateral side 18. The key 24 is generally planar and has an outward lateral edge 25 with a mostly planar surface shown facing lateral side 18. An upper edge 26 (optionally referred to as an inner edge) is shown adjacent a terminal end of the lateral edge 25 distal from the interface 15. Upper edge 26 has a curved profile complimentary to a portion of side 22 proximate to side 18. The perimeter of the key 24 includes a lower edge 28 (optionally referred to as an outer edge) that is opposite the upper edge 26, and shown facing interface 15. Teeth 30 are on the lower edge 28 that extend along a width or thickness of the key 24. Tips of the teeth 30 project in a direction away from the upper edge 26 and past a lower boundary of the recess 16. Further in the example of FIG. 1, the tips of the teeth 30 are shown embedded into a ledge 31, which is defined where the outer surface of the box 14 transitions a distance radially inward adjacent interface 15.

Still referring to FIG. 1, key 24 includes a bore 32 shown formed through its width. Bore 32 receives a fastener 34 which mounts the key 24 to the pin 12. In an example, fastener 34 has an elongated shaft with a threaded end that inserts in the bottom of the recess 16. In this example, the key 24 is rotatable about shaft portion of the fastener 34. A portion of a loading element 36 is shown occupying space in the recess 16 adjacent the key 24. As shown, the loading element 36 and opposing lateral side 20 have complimentary profiles. As provided in more detail below, the loading element 36 orients the key 24 such that the teeth 30 will engage the box 14 when the pin 12 and/or box 14 rotate relative to one another in a decoupling direction. A surface of key 24 facing away from the recess 16 defines a front face 38.

Figures 2A, 2B:
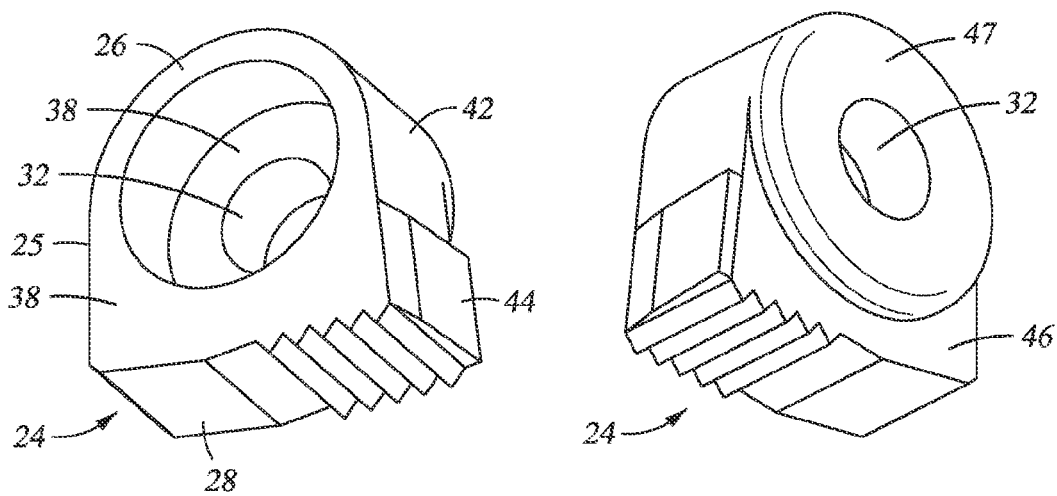
FIGS. 2A and 2B are respective front and rear perspective views of a key from the anti-rotation system of FIG. 1 and in accordance with the present invention.

In FIGS. 2A and 2B are perspective front and rear views of the key 24. In the example of FIG. 2A, the bore 32 transitions radially inward a distance from the front face 38 to define a flange 40 in the bore 32. The flange 40 provides a surface that interferes with the fastener 34 and retains the key 24 in the recess 16 when the shaft portion of the fastener 34 threads into the recess 16. Further shown in the example of FIG. 2A is an inward lateral edge 42 of the key 24, defined along the periphery of the key 24 between the upper and lower edges 26, 28. A portion of the lateral edge 42 proximate the lower edge 28 protrudes out and away from the outward lateral edge 25 to define a loading surface 44; where the loading surface 44 angles away from lateral edge 42 with distance away from the front face 38. A compound angle is formed on the loading surface 44 where the slope of its outer surface changes at a distance from the front face 38. In FIG. 2B, a rear face 46 of the key 24 is shown on a side opposite the front face 38. Unlike the mostly flat front face 38, the example of the key 24 in FIG. 2B has a raised portion 47 circumscribing the bore 32 and having a generally circular outer periphery.

Figure 3A:
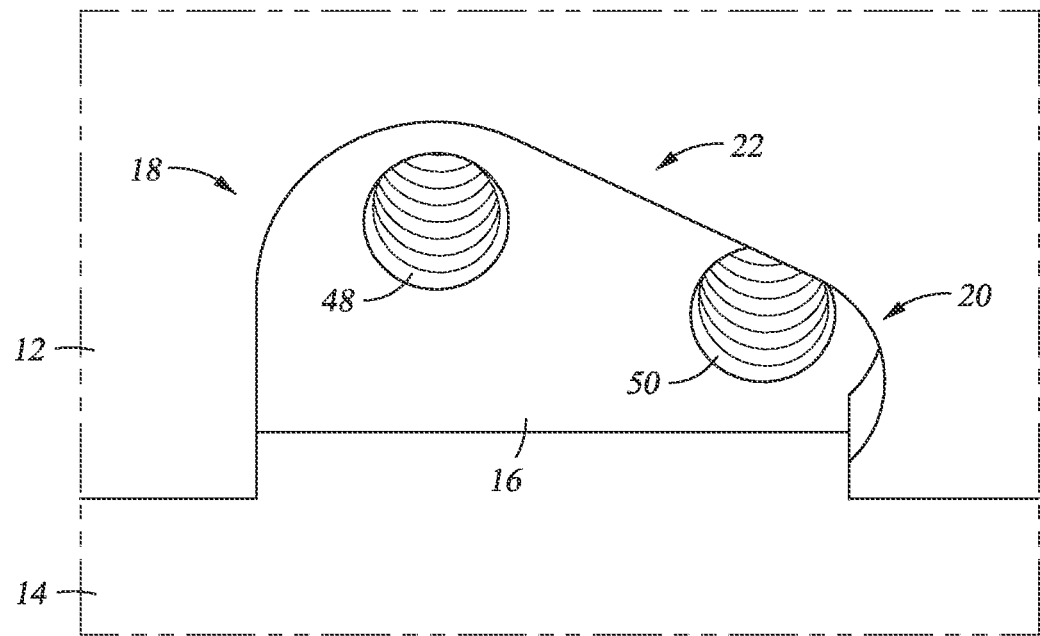
FIGS. 3A and 3B are perspective views of alternate embodiments of recesses in a tubular connector for receiving the anti-rotation system of FIG. 1 and in accordance with the present invention.
Figure 3B:
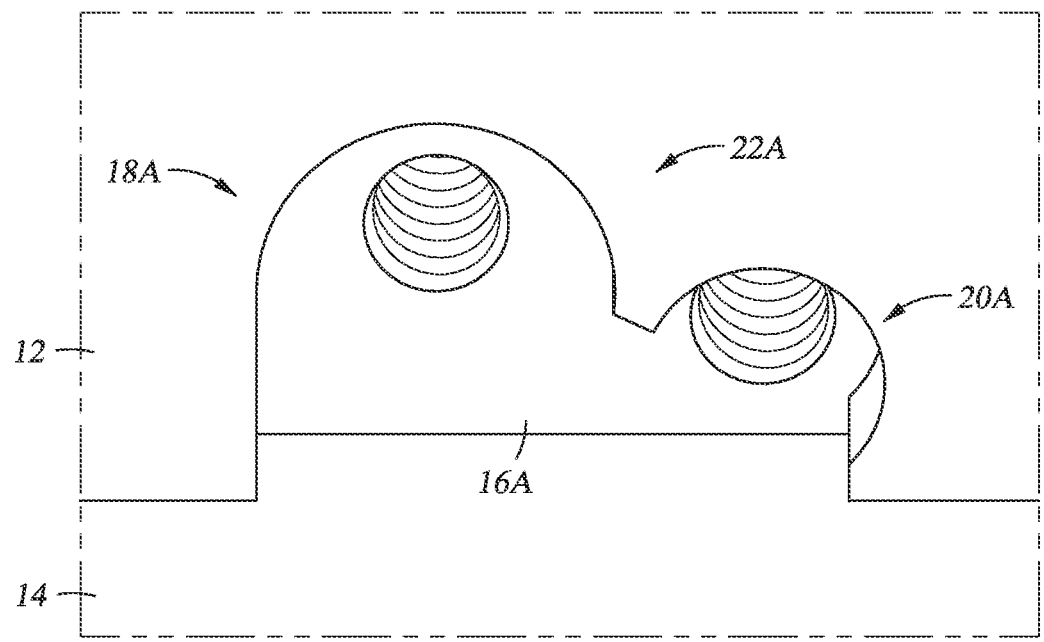

Referring now to FIG. 3A, a perspective view of the recess 16 is shown in the pin 12. In this example, bores 48, 50, which may be threaded, are shown in a rear wall of the recess 16 and which are formed radially inward into the pin 12. The bores 48, 50 can provide a mounting receptacle for the fastener 34 and loading element 36. An alternate embodiment of a recess 16A is shown in perspective view in FIG. 3B, where an upper side 22A of the recess 16A has a mid-portion that juts inward between the lateral side 18A and opposing side 20A. This is in contrast to the embodiment of the recess 16 of FIG. 3A, where the upper side 2 follows a generally straight path between the lateral side 18 and opposing side 20.

Figure 4:
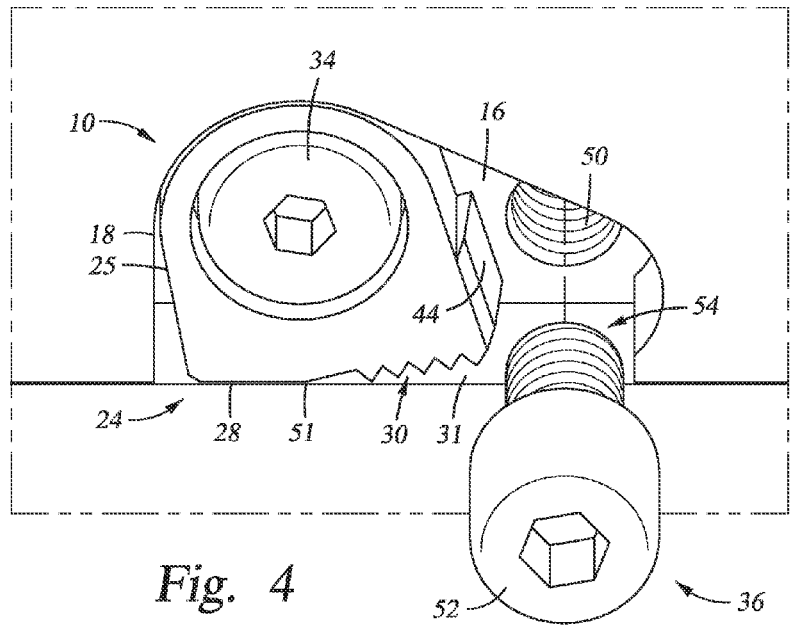
FIGS. 4 and 5 are side perspective views of examples of assembling the anti-rotation system of FIG. 1 in accordance with the present invention.

Shown in FIG. 4 is an example of a step of installing the anti-rotation assembly 10. As illustrated, the key 24 is pinned in the recess by the fastener 34. Also, a portion of the lower edge 28 proximate the outward lateral edge 25 is generally flat and rests on the ledge 31. The embodiment of the key 24 in FIG. 4 is oriented so that when the key 24 rests on the flat portion of the tower edge 38, the outward lateral edge 25 lies in a plane set at an angle with the lateral side 18. A transition 51 on the tower edge 28 defines a change in slope of the lower edge 28, so that the portion of lower edge 28 on a side of transition 51 distal from lateral edge 25, angles obliquely away from the ledge 31. Moreover, in the configuration of FIG. 4, the angling of lower edge 28 positions the teeth 30 out of contact with the ledge 31. Further illustrated in the embodiment of FIG. 4, the loading element 36 includes a cylindrically shaped head 52 with an attached elongated coaxial post 54, where the head 52 has a diameter greater than that of the post 54.

Figure 5:
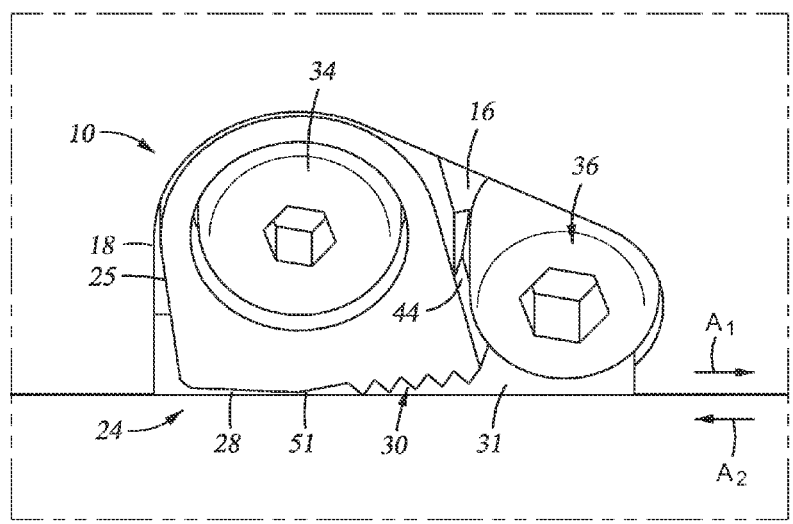

Post 54, which may be threaded, selectively inserts within bore 50 for mounting loading element 36 in recess 16. The post 54 is insertable into the bore 50 without contacting the key 24; whereas a side of the larger diameter head 52 contacts the loading surface 44 when mounting the loading element 36 in the recess 16. Referring now to FIG. 5, mounting the loading element 36 in the recess 16 imparts a rotational force onto the key 24, via the loading surface 44, that rotates the key 24 clockwise and urges the teeth 30 against the ledge 31. Urging the teeth 30 against ledge 31 can cause the teeth 30 to contact the ledge 31, or can cause the teeth 30 to bite into and penetrate the ledge 31. In an example, teeth 30 distal from loading surface 44 are urged against ledge 31, whereas teeth 30 proximate loading surface 44 are set back from ledge 31. Contacting the teeth 30 as shown is an example of setting the key 24, so that relative rotational movement of the pin 12 or box 14, as shown by arrows $A_1$, $A_2$, further rotates the key 24 in a clockwise direction until outward lateral edge 25 contacts lateral side 18 (FIG. 1). After which, further rotational movement of the pin 12 and/or box 14 embeds the tips of the teeth 30 deeper into the ledge 31. Thus the head 52 and loading surface 44 are strategically dimensioned so that mounting the loading element 36 sets the key 24. In the example shown, relative rotational movement of the pin 12 or box 14 in the direction of arrows $A_1$, $A_2$ decouples the pin 12 from box 14. Alternative embodiments exist wherein the anti-rotation assembly 10 is mounted on the box 14.

Figure 6:
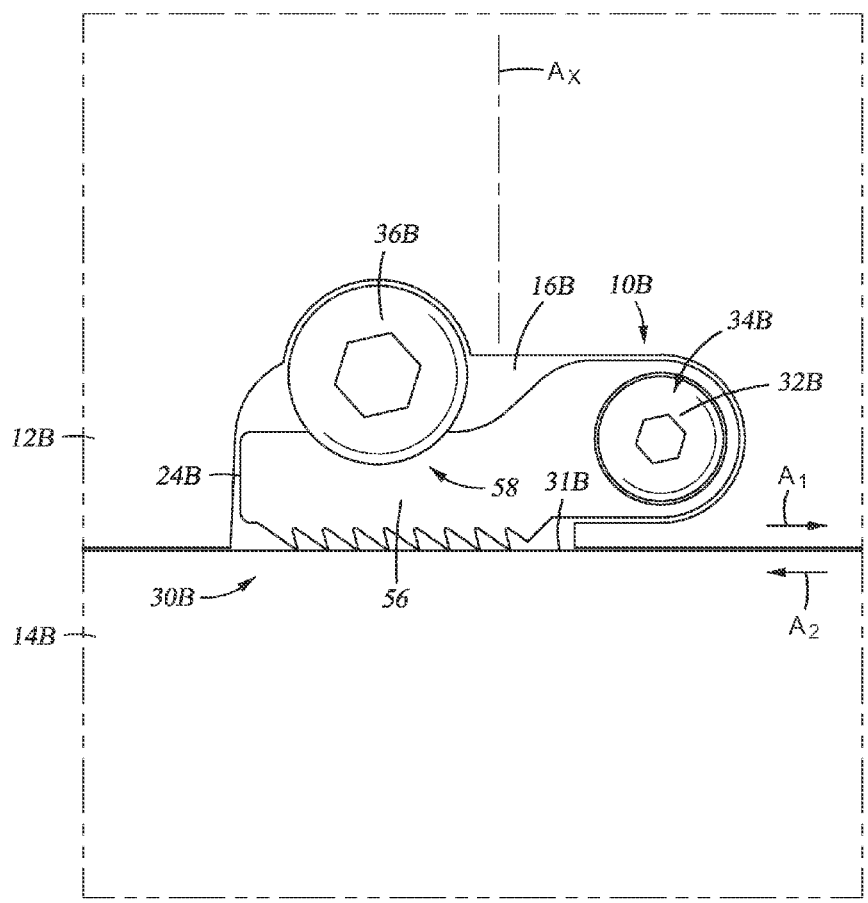
FIG. 6 is a side elevational view of an alternate example of an anti-rotation system in accordance with the present invention.

Depicted in a side view in FIG. 6, is an alternate embodiment of an anti-rotation assembly 10B. In this example, key 24B is set in a recess 16B, which is generally elongate and circumscribes a portion of an outer surface of the pin 12B. The key 24B, which is also elongate, has a bore 32B at one end in which fastener 34B pivotingly pins the key 24B within recess 16B. An elongate portion 56 of the key 24B extends in recess 16B and away from bore 32B. Teeth 30B are provided on a lower edge of the elongate portion 56. Forward and rear surfaces of the teeth 30B are set at an angle with respect to the axis $A_X$ of the pin 12B and box 14B. However, forward surfaces (the sides facing away from the bore 32B) lie at an angle with respect to the axis $A_X$ greater than the angle between the rear surfaces (the sides facing towards the bore 32B) axis $A_X$. A profile 58, shown curved into the key 24B on a side of the elongate portion 56 opposite the teeth 30B, provides a space to receive a loading element 36B. The loading element 36B, which may be substantially the same as the loading element 36 of FIGS. 1, 4, and 5, can provide a force to set teeth 30B into contact with ledge 31B on the box 14B. In FIG. 6, the key 24B is pivotable around fastener 34B, which is laterally offset from the teeth 30B and the loading element 36B. As configured, when the pin 12B and box 14B begin to decouple by rotation in the directions of arrows $A_1$, $A_2$, the teeth 30B further engage the box 14B on a left-hand threaded connection. In an alternate embodiment, the arrangement of FIG. 6 could be mirrored, with the pivot point positioned on the left of the teeth 30B and the loading element 36B, which would permit use of the anti-rotation assembly on a right-hand threaded connection.

Figure 7A:
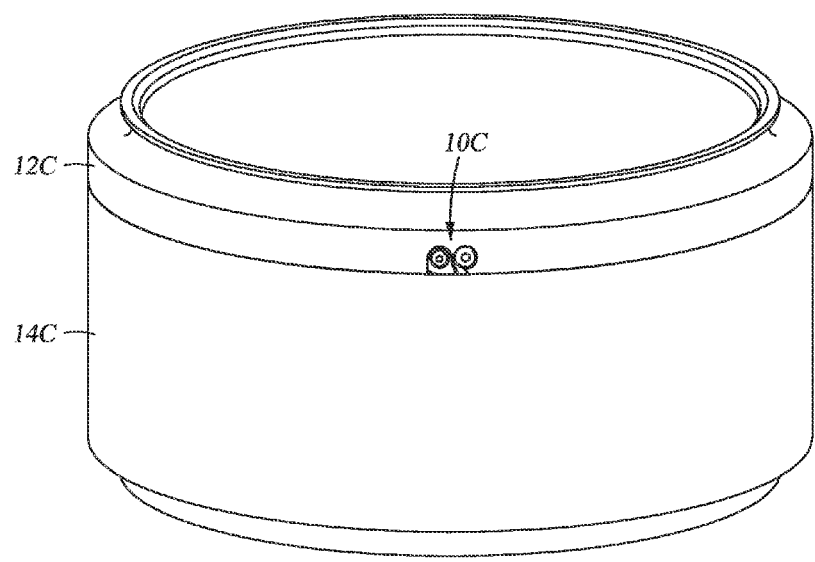
FIG. 7A is a side perspective view of an alternate example of an anti-rotation system retaining a pin and box connection an in accordance with the present invention.
Figure 7B:
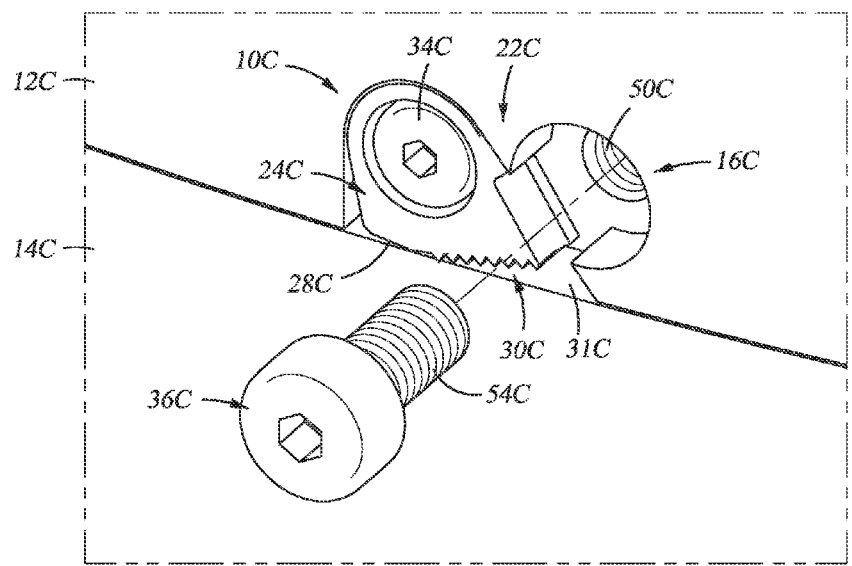
FIG. 7B is a side perspective view of an example of assembling the anti-rotation system of FIG. 7A in accordance with the present invention.

Shown in perspective view in FIG. 7A is an alternate example of an anti-rotation assembly 10C used for maintaining a connection between a pin 12C and box 14C. As further illustrated in perspective view in FIG. 7B, the anti-rotation assembly 10C includes a key 24C rotatably mounted to pin 12C via fastener 34C and set within recess 16C. A loading element 36C is also shown for lateral engagement with the key 24C and as described above, to put the key 24C in a set position so the teeth 30C on its lower edge 28C can engage ledge 31C on an upper end of box 14C. In this example, threads are shown formed in bore 50C and on post 54C so loading element 36C can be mounted in recess 16C. The key 24C, fastener 34C, and loading element 36C of FIGS. 7A and 7B can be the same or substantially similar to the key 24, fastener 34, and loading element 36 of FIG. 1. However, the upper side 22C of recess 16C of FIGS. 7A and 7B juts sharply into a mid-portion of recess 16C so that the periphery of the recess 16C more closely matches a greater portion of the outer respective surfaces of the key 24C and loading element 36C. An example of energizing the assembly 10C of FIGS. 7A and 7B is provided in FIGS. 8A and 8B.

Figure 8A:
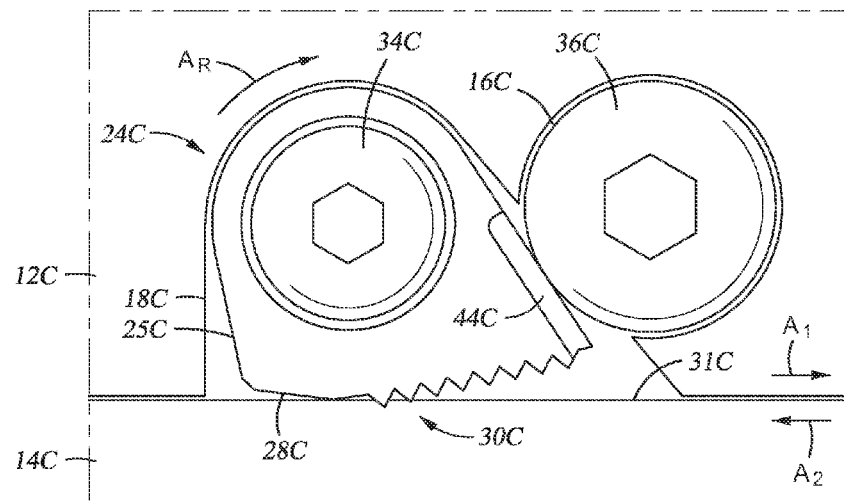
FIGS. 8A and 8B are side views of engaging the anti-rotation system of FIG. 7A in accordance with the present invention.
Figure 8B:
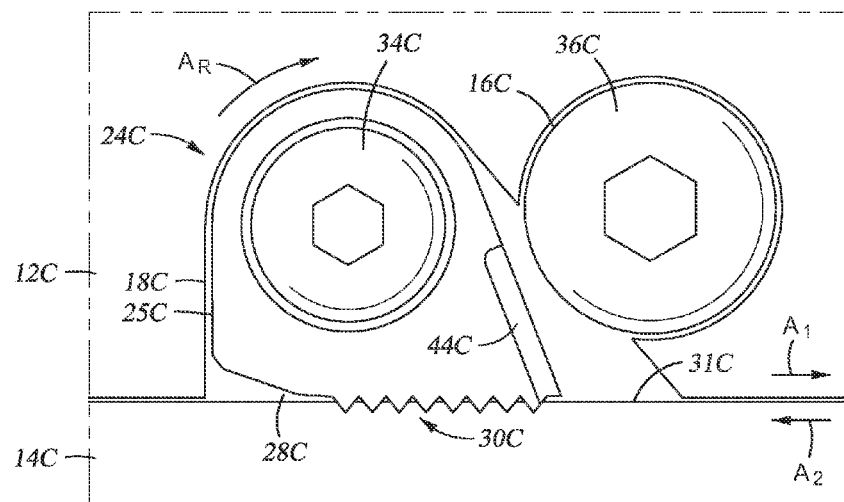

Referring to FIG. 8A, the loading element 36C has been mounted in recess 16C to exert a lateral force onto the loading surface 44C, which rotates the key 24C about its pinned connected with the fastener 34C in the direction indicated by the curved arrow $A_R$. Rotating the key 24C as shown urges teeth 30C on the lower surface 28C into contact with the ledge 31C to set the key 24C. As discussed above, once the key 24C is set and relative movement occurs as indicated by arrows $A_1$, $A_2$ a resultant force is created between the ledge 31C and teeth 30C in contact with the ledge 31C when. The resultant force can be from friction between one or more of the teeth 30C and ledge 31C, or from one or more of the teeth 30C deformingly protruding into the ledge 31C. As illustrated in FIG. 8B, relative rotation of the pin 12C and box 14C has occurred as indicated by arrows $A_1$, $A_2$, thereby further rotating key 24C in the direction of curved arrow $A_R$. Sufficiently rotating the key 24C engages substantially all of the teeth 30C on the key 24C, and positions outward lateral edge 25C against lateral side 18C; which exerts a resultant force between pin 12C, and box 14C to prevent further relative rotation in the direction of arrows $A_1$, $A_2$.

Figure 9A:
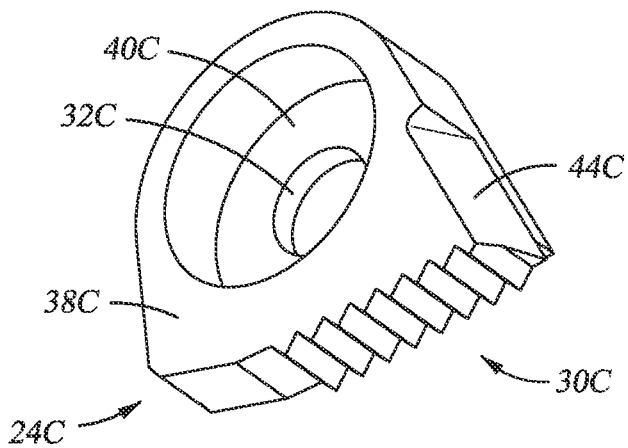
FIGS. 9A and 9B are respectively front and rear perspective views of an example of a key of the anti-rotation system of FIG. 7A in accordance with the present invention.
Figure 9B:
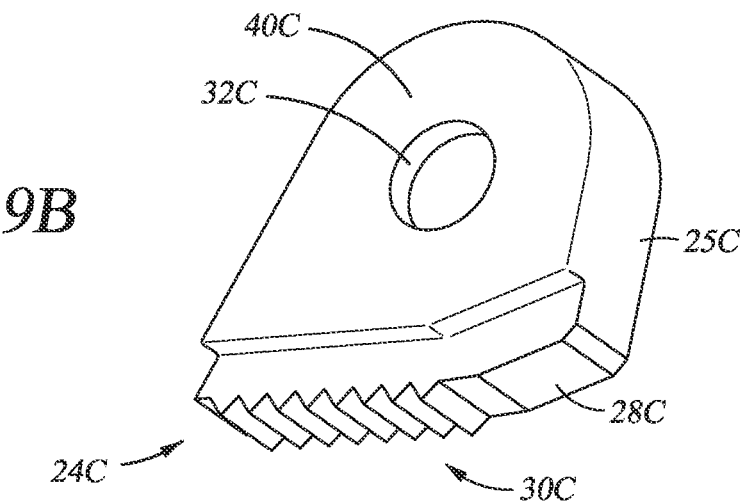
Figure 10:
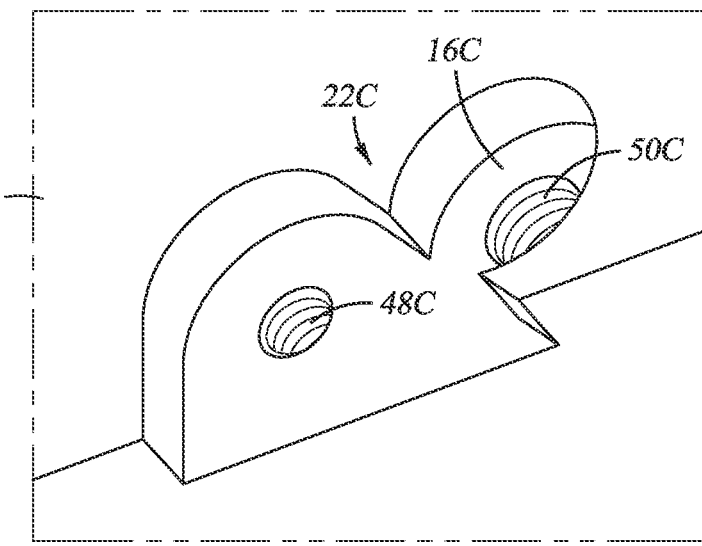
FIG. 10 is a perspective view of an example of a recess configured to receive the anti-rotation system of FIG. 7A in accordance with the present invention.

FIGS. 9A and 9B are respective front and rear views of an example of the key 24C of FIG. 7A. Similar to key 24 of FIG. 2A, key 24C includes a bore 32C though a front face 38C whose diameter transitions radially inward to define a flange 40C; where flange 40C provides a backstop for fastener 34C. Unlike key 24 of FIG. 2B, key 24C has a rear face 46C that is generally flat from bore 32C to the outer periphery of the key 24C, except for the lower edge 28C. Instead, the rear face 46C transitions inward adjacent the lower surface 28C, so the portion of the key 28C along the lower surface 28C is thinner than the other portions of the key 28C. An illustration of the recess 16C without key 24C or loading element 36C is shown in perspective view in FIG. 10; here the bores 48C and 50C are illustrated in a rear of the recess 16C and extending radially into the pin 12C.

Figure 11A:
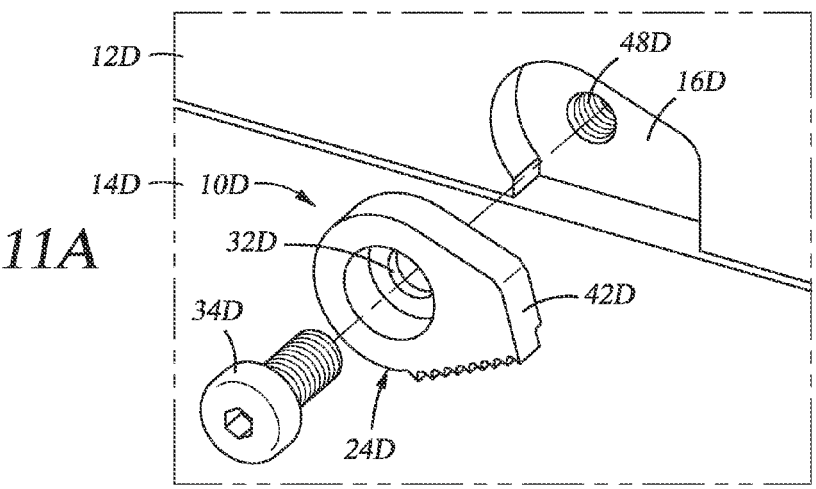
FIG. 11A is a side perspective view of an example of assembling alternate embodiment of an anti-rotation system in accordance with the present invention.
Figure 11B:
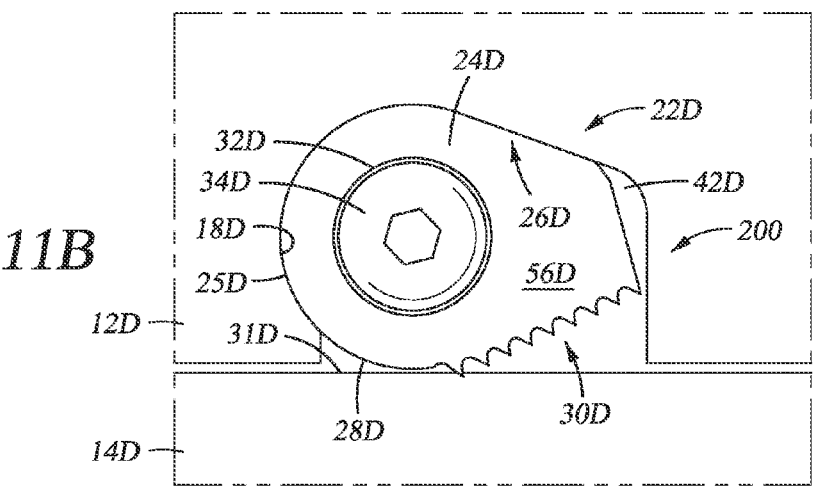
FIGS. 11B and 11C are side views of engaging the anti-rotation system of FIG. 11A in accordance with the present invention.

Provided in a perspective view in FIGS. 11A and 11B is another alternate embodiment of an anti-rotation system 10D shown being installed in a recess 16D. In this example, recess 16D is formed on a side of pin 12D, and the anti-rotation system 10D includes a key 24D with a fastener 34D shown being inserted through a bore 32D in the key 24D. An end of the fastener 34D mounts into a bore 48D in recess 16D for rotatably retaining the key 24D in recess 16D. The key 24D has an elongate body 56D shown extending between the bore 32D and inward lateral edge 42D. An outward lateral edge 25D of the key 24D has a generally curved periphery, whereas inward lateral edge 42D and tower surface 28D are generally flat and disposed substantially normal to one another. An upper edge 16D is curved proximate to where it joins outward lateral edge 25D and depends at an oblique angle from its curved portion to where it joins with inward lateral edge 42D. In the example of FIG. 11B, outward lateral edge 25D is profiled complimentary to lateral side 18D and upper edge 26D is profiled complimentary to upper side 22D. Outward lateral edge 25D is in contact with lateral side 18D and upper edge 26D is in contact with upper side 22D. In the orientation of FIG. 11B, the key 24D contacts ledge 31D proximate where outward lateral edge 25D joins lower edge 28D. Because of the respective orientations of outward lateral edge 25D and lower edge 28D, lower edge 28D is angled with respect to ledge 31D and most of the teeth 30D on lower ledge 28D are spaced apart from ledge 31D. However, at least one of the teeth 30D contacts ledge 31D when key 24D is in the orientation and configuration of FIG. 11B due to strategic dimensioning of the outward lateral edge 25D, lateral side 18D, upper edge 26D, and upper side 22D.

Figure 11C:
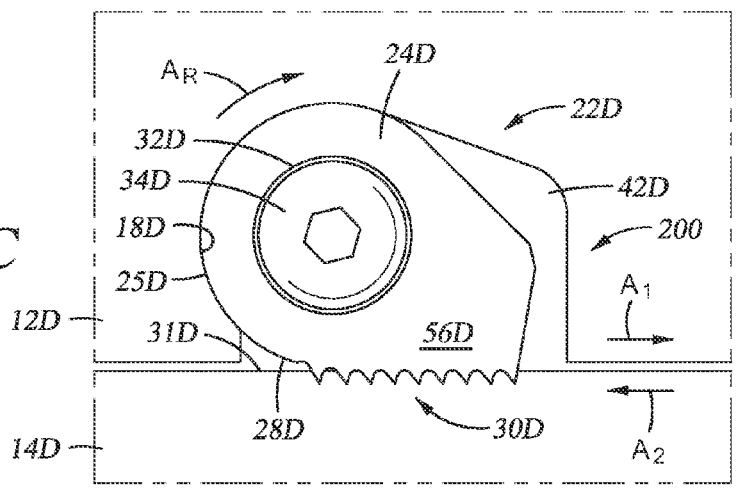

FIG. 11C illustrates an example of the key 24D rotated in the direction of curved arrow $A_R$ due to relative movement of the pin 12D and box 14D as illustrated by arrows $A_1$, $A_2$. As such the teeth 30D (FIG. 11B) have become embedded into the ledge 31D, while the outward lateral edge 25D remains in sliding contact with the lateral side 18D to result in an anti-rotation resultant force being imparted to the pin 12D and box 14D.

Figure 12A:
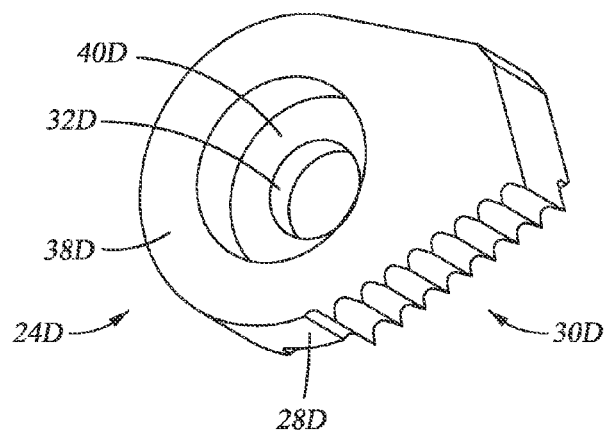
FIGS. 12A and 12B are respective front and rear perspective views of an example of a key of the anti-rotation system of FIG. 11A in accordance with the present invention.
Figure 12B:
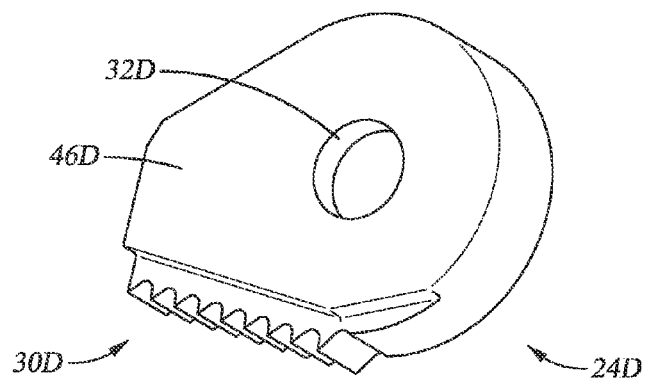
Figure 13:
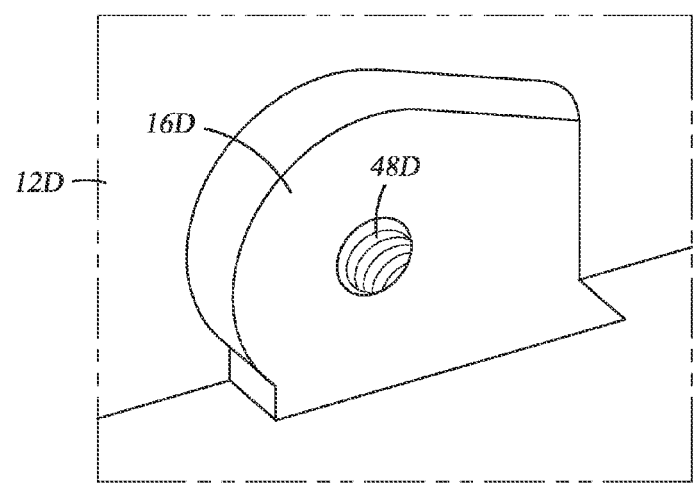
FIG. 13 is a perspective view of an example of a recess configured to receive the anti-rotation system of FIG. 11A in accordance with the present invention.

FIGS. 12A and 12B are respective front and rear views of the key 24D of FIG. 11A. Similar to key 24 of FIG. 2A, the diameter of bore 32D changes to define a flange 40D for engaging an inner surface of fastener 34D (FIG. 11A). Similar to key 24C of FIG. 9B, the rear face 46D juts inward adjacent lower ledge 28D so that the teeth 30D are formed on a thinner portion of key 24D. FIG. 13 shows the recess 16D formed on an outer surface of the pin 12D and a bore 48D in a rear side of recess 16D.

Figure 14A:
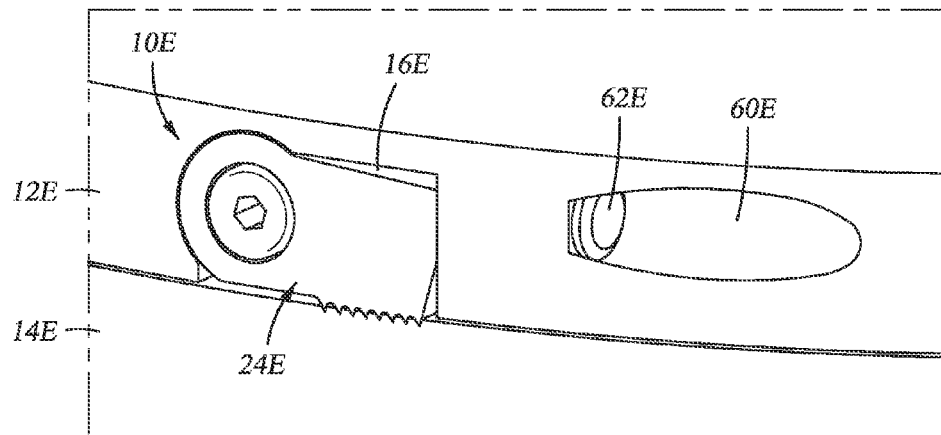
FIG. 14A is a side perspective view of an alternate example of an anti-rotation system retaining a pin and box connection an in accordance with the present invention.

FIG. 14A provides in a perspective view another alternate embodiment of an anti-rotation system 10E retaining a threaded connected (not shown) between the pin 12E and box 14E. In this example, a key 24E is set in a recess 16E formed into an outer surface of pin 12E. An annular slot 60E, also formed through an outer surface of the pin 12E, is shown having an opening spaced apart from the recess 16E along a circumference of the pin 12E. The slot 60E extends tangentially to the circumference of the pin 12E and intersects the recess 16E at an end opposite its opening. The tangential path results in the slot 60E forming a furrow along a portion of the circumference of the pin 12E until the pin 12E eventually fully circumscribes the slot 60E. A cylindrically shaped set screw 62E is shown inserted into the slot 60E and as described below, in selective contact with the key 24E.

Figure 14B:
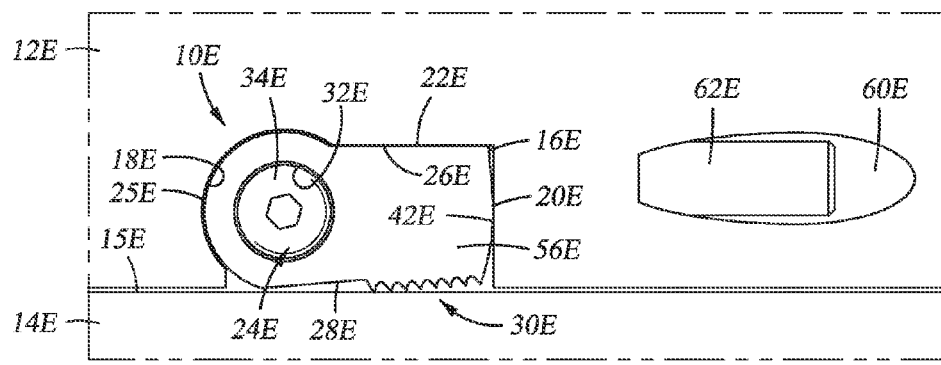
FIGS. 14B and 14C are side views of engaging the anti-rotation system of FIG. 14A in accordance with the present invention.

Shown in FIG. 14B is a side view of the anti-rotation assembly 10E being assembled to retain the threaded connected between the pin 12E and box 14E. As shown, the key 24E has a generally curved outward lateral edge 25E and is rotatingly mounted to the pin 12E with fastener 34E that extends through bore 32E in key 24E. The key 24E has an elongate body 56E that extends away from outward lateral edge 25E and on a side opposite the bore 32E. The lower edge 28E is generally planar while inward lateral edge 42E is illustrated having an optional concave profile. Upper edge 26E is generally planar adjacent where it joins with inward lateral edge 42E; upper edge 26E curves outward from bore 32E proximate to where it joins with outward lateral edge 25E. The recess 16E and key 24E are complimentarily profiled, so that when the key 24E is oriented as shown in FIG. 14B, the outward lateral edge 25E is in sliding contact with lateral side 18E, and upper edge 26E is in contact with upper side 22E; which positions the lower edge 28E at an angle with ledge 31E.

Figure 14C:
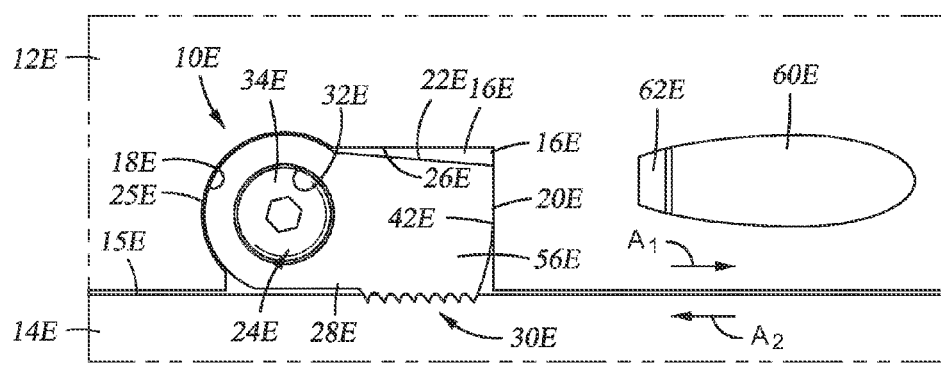
Figure 15:
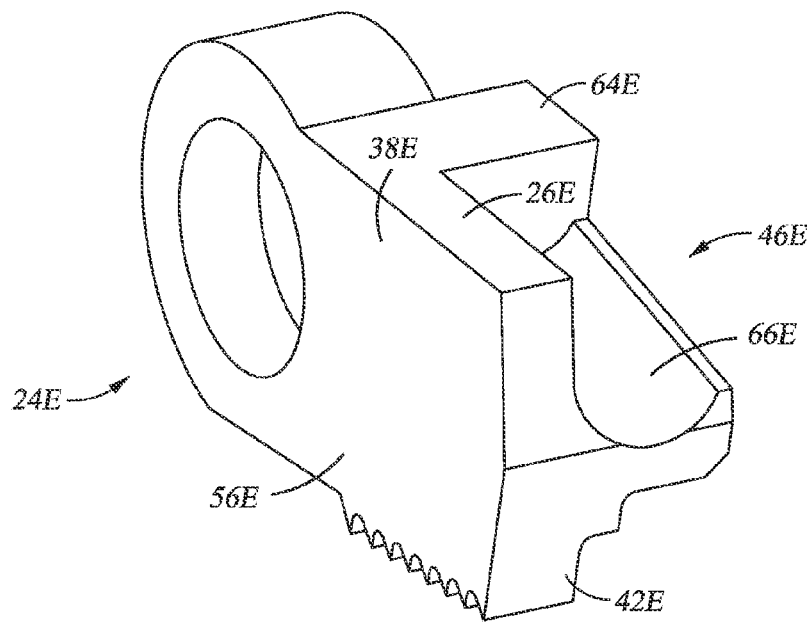
FIG. 15 is perspective views of an example of a key of the anti-rotation system of FIG. 14A in accordance with the present invention.
Figure 16:
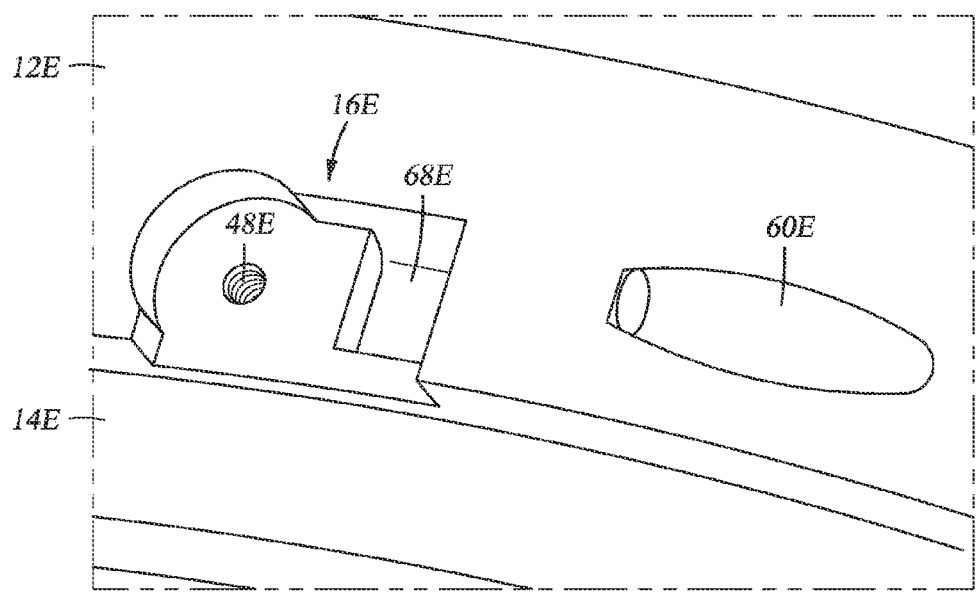
FIG. 16 is a perspective view of an example of a recess configured to receive the anti-rotation system of FIG. 14A in accordance with the present invention.

Referring now to FIG. 15, a perspective view of key 24E is illustrated where an extension 64E is shown projecting out from its rear face 46E and in a direction away from front face 38E. A channel 66E is shown formed in the extension 64E that extends generally parallel with the elongated body 56E and with an opening at the inward lateral edge 42E. The channel 66E has a profile that curves about an axis (not shown) which runs generally parallel with a length of body 56E. Referring back to FIG. 14B, the channel 66E registers with slot 60E, so that by urging set screw 62E into contact with channel 66E, contact between the set screw 62E and channel 66E urges body 56E towards interface 15E thereby rotating key 24E clockwise to set teeth 30E into ledge 31E. Thus, as shown in FIG. 14C, relative movement of the pin 12E and/or box 14E in the direction of arrows $A_1$, $A_2$, embeds teeth 30E (FIG. 14B) into ledge 30 to prevent further relative rotation of the pin 12E and box 14E. FIG. 16 illustrates a chamber 68E in the pin 12E that extends radially inward from an end of recess 16E, where the chamber can provide a space for extension 64E (FIG. 15). Further, bolthole 48E in recess 16E provides for insertion of fastener 34E (FIG. 14A.).

Figure 17A:
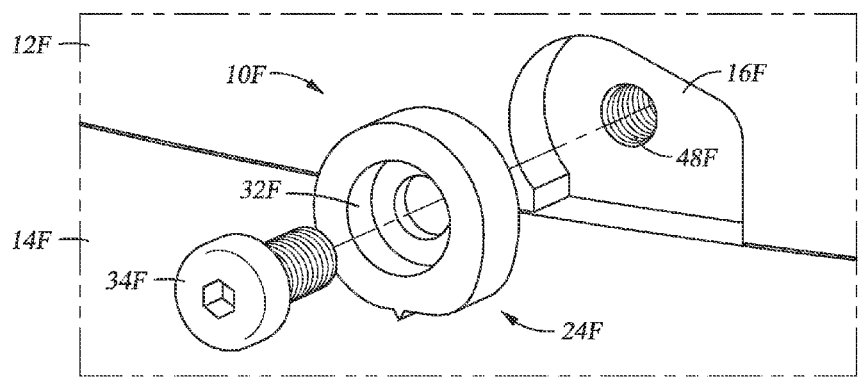
FIG. 17A is a side perspective view of an example of assembling an alternate embodiment of an anti-rotation system in accordance with the present invention.
Figure 17B:
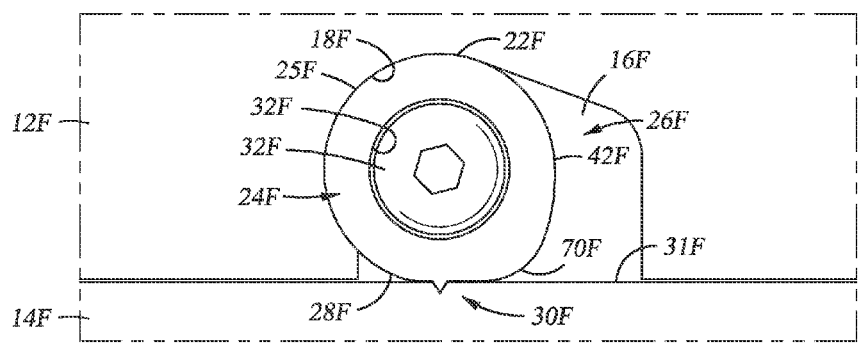
FIGS. 17B and 17C are side views of engaging the anti-rotation system of FIG. 17A in accordance with the present invention.
Figure 17C:
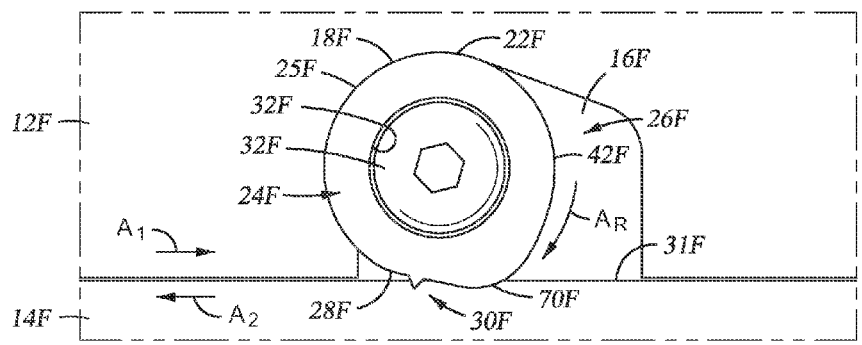

Shown in a perspective view in FIG. 17A is an alternative embodiment of an anti-rotation system 10F. In this example, fastener 34F inserts through a bore 32F in a key 24F to attach key 24F to pin 12F. A bore 48F in a rear wall of a recess 16F in pin 12F is configured to receive an end of fastener 34F, so the key 24F can be mounted in the recess 16F. In an example, the recess 16F of FIG. 17A is the same or similar to the recess 16D of FIG. 11A. The key 24F is shown in a side view in FIG. 17B mounted to pin 12F within recess 16F. The key 24F has an outward lateral edge 25F and upper edge 26F profiled with substantially a circular radius. Inward lateral edge 42F has a planar portion and is curved where it joins upper edge 26F and lower edge 28F. Similarly, a portion of lower edge 28F is planar, and a portion that is curved where it joins outward lateral edge 25F. The combination of planar and curved portions on the outer periphery of the key 24F gives it a cam like configuration. Where the portion of the key 24F most distal from an axis of the bore 32F is in the region where the lower edge 28F joins the inward lateral edge 42F; which defines a cam surface 70F whose radius varies along its circumference. Further shown in the example of FIG. 17B is a tooth 30F on tower edge 28F and spaced apart from cam surface 70F and set in ledge 31F. Referring now to FIG. 17C, relative movement of the pin 12F or box 14F as shown by arrows $A_1$, $A_2$, rotates key 24F in the direction of curved arrow $A_R$. This rotation sets cam surface 70F onto ledge 31F and wedges outward lateral edge 35F and upper edge 26F respectively against lateral side 18F and upper side 22F, to exert a resultant force on the pin 12F and box 12F in a direction opposite their rotation and to oppose their decoupling.

Figure 18A:
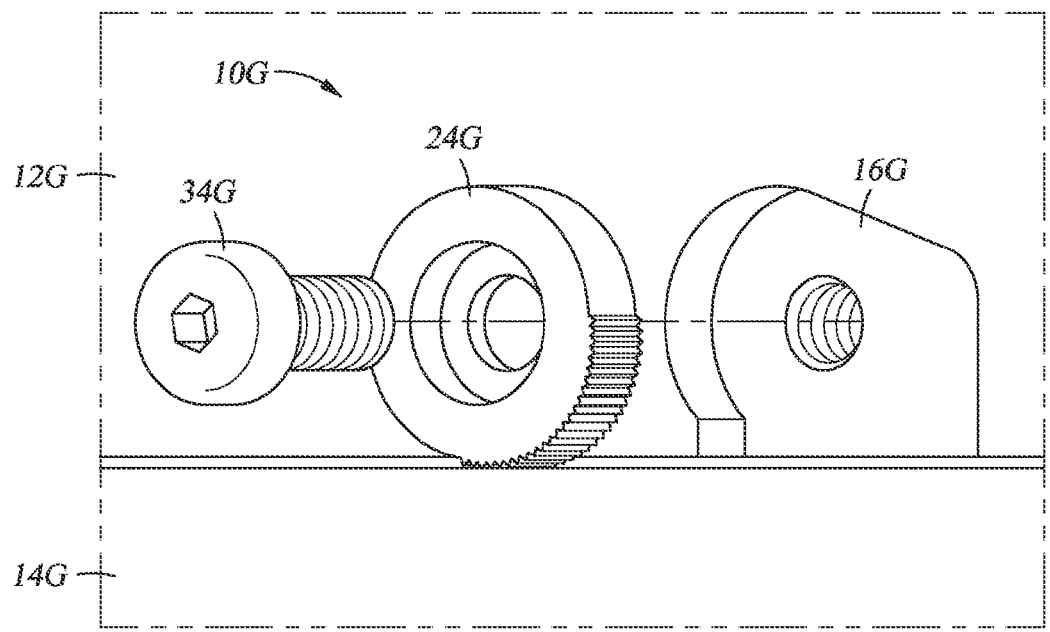
FIG. 18A is a side perspective view of an example of assembling an alternate embodiment of an anti-rotation system in accordance with the present invention.
Figure 18B:
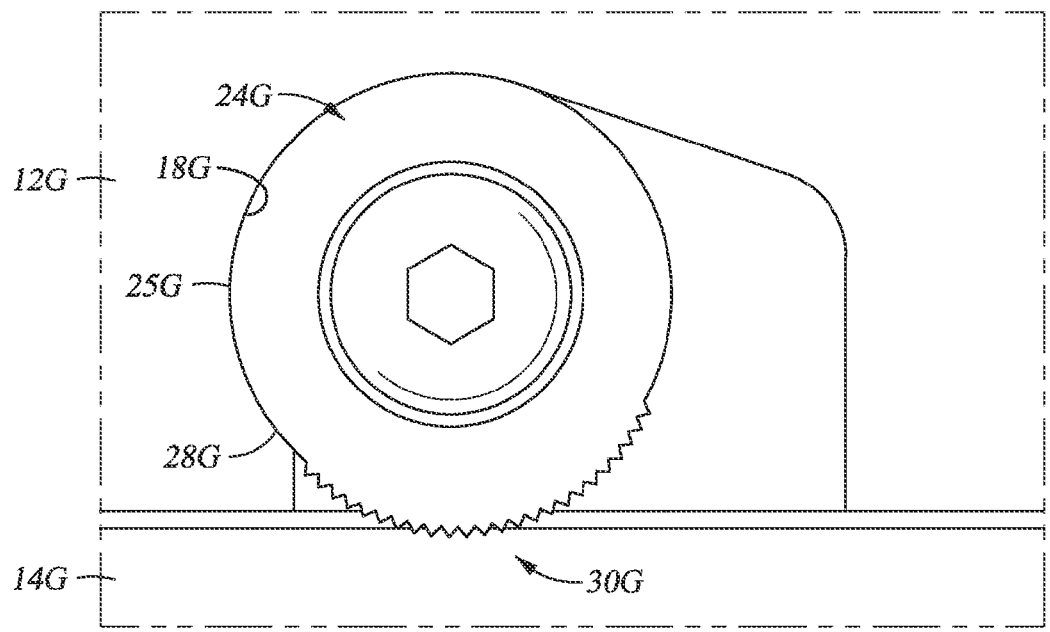
FIG. 18B is a side view of engaging the anti-rotation system of FIG. 18A in accordance with the present invention.

Shown in perspective view in FIG. 18A, is another alternate example of an anti-rotation assembly 10G. In this example, anti-rotation assembly 10G is being assembled, and is similar to anti-rotation assembly 10F of FIG. 17A. Anti-rotation assembly 10G is different in that the outer circumference of key 24G is generally circular except for a generally planar portion along lower edge 28G. Further, instead of a single tooth, a row of teeth 30G are provided on key 24G and extend from a planar portion of lower edge 28G and along adjacent edges of the key 24G. The key 24G is illustrated in side view in FIG. 18B in a position that generates a reactant force to counter decoupling of the pin 12G and box 12G.

It should be pointed out that each of the anti-rotation assemblies described above operate in response to a limited amount of angular rotation of one or both of the tubulars attached by a threaded connection. Similarly, a limited amount of energy is consumed in operating the anti-rotation assemblies herein. In an example, the present design creates a rapid increase in resistance to decoupling of threaded tubulars by increasing the friction between any of the above described keys and adjacent connectors. Angular rotation of the tubulars may be limited to a designated amount so that sealing between the connected tubulars is maintained.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. For example, all or a portion of any anti-rotation assembly described herein can be assembled and installed at a manufacturing facility prior to delivery in the field. Optionally, the keys described herein are installed prior to delivery and the loading elements are installed after the pin and box are delivered to the field. In a alternative, the loading members can include a tapered bolt, one having a cam like configuration so that its rotation could set an associated key, a clip, and a spring member (coiled or leaf). Moreover, the anti-rotation assemblies described herein are not limited to the orientations as illustrated. Instead, the anti-rotation assemblies can be oriented to prevent relative rotation of tubulars having right hand as welt as left hand threads. As such, the anti-rotation assemblies described herein can be implemented to prevent decoupling of a threaded attachment between tubulars, or prevent over-tightening of a threaded connection between tubulars. These and other similar modifications will readily suggest themselves to those skilled in the art, and are intended to be encompassed within the spirit of the present invention disclosed herein and the scope of the appended claims.

What is claimed is:

1. A threaded connection between first and second tubulars comprising:
   interface surfaces on the first and second surfaces that abut when the threaded connection is made up;
   a recess in a side of the first tubular adjacent the interface surface of the first tubular;
   a key mounted in the recess, the key being rotatable an increment about a key axis that is generally perpendicular to a first tubular axis of the first tubular, the key comprising:
   a non-circular perimeter; and
   a locking surface on a portion of the perimeter farther from the key axis than a distance from the key axis to the interface surface of the second tubular when the threaded connection is made up, the locking surface having at least one tooth that is in gripping contact with the interface surface of the second tubular when the key is rotated in a first direction about the key axis to locked position to resist decoupling rotation of the first and second tubulars.

2. The threaded connection of claim 1, wherein the recess has a lateral surface that is engaged by a portion of the perimeter of the key while the key is in the locked position.

3. The threaded connection of claim 1, further comprising a fastener that inserts along the key axis through a bore in the key and into a receptacle in a base of the recess, the key being rotatable around the fastener.

4. The threaded connection of claim 1, further comprising a loading element selectively inserted into the recess adjacent the key for setting the key into an engaging orientation with the tooth in contact with the interface surface of the second tubular.

5. The threaded connection of claim 4, wherein a portion of the perimeter of the key is in interfering contact with the loading element while the key is in the locked position.

6. The threaded connection of claim 1, wherein the at least one tooth comprises a row of teeth, with a first tooth in the row being closer to the key axis than a last tooth in the row.

7. The threaded connection of claim 1, wherein the tooth bites into the interface surface of the second tubular while the key is in the locked position.

8. The threaded connection of claim 1, wherein:
the recess has a partially circular lateral edge portion that is on a lagging side of the key axis relative to the direction of uncoupling rotation of the first tubular; and
the perimeter of the key has a partially circular portion that is in contact with the circular lateral edge portion of the recess when the key is in the locked position.

9. The threaded connection of claim 1, wherein:
the recess has a flat edge portion that faces generally toward the interface surface of the second tubular;
the perimeter of the key has a flat portion that abuts the flat edge portion of the recess while the key is in an unlocked position; and
the abutment of the flat portion of the key with the flat edge portion of the recess provides a stop for rotation of the key about the key axis in a second direction.

10. The threaded connection of claim 1, wherein the locking surface is positioned such that any decoupling rotation of the first and second tubulars causes the key to rotate farther about the key axis in the first direction and the tooth to imbed into the interface surface of the second tubular to resist the decoupling rotation.

11. The threaded connection of claim 1, wherein the at least one tooth comprises a row of teeth that is flat and parallel with the interface surface of the second tubular while the key is in the locked position.

12. A method of retaining a threaded connection between a first tubular and a second tubular, the first and second tubulars having mating interface surfaces that abut each other while the threaded connection is made up, the method comprising:
a. providing a key having a perimeter with a variable radius relative to a key axis of the key, the perimeter having a locking surface with at least one tooth;
b. pinning the key in a recess formed along a portion of a circumference of the first tubular and joining the interface surface of the first tubular, the pinning locating the locking surface farther from the key axis than a distance from the key axis to the interface surface of the second tubular when the threaded connection is made up, and so that the key is rotatable about the key axis; and
c. rotating the key in a first direction to a set position so that the tooth of the key is in contact with the interface surface of the second tubular, and so that when one of the first or second tubulars rotate in a decoupling direction, the key rotates further in the first direction about the key axis to a locked position causing the contact between the tooth of the key and interface surface of the second tubular to generate a force that resists further decoupling of the first and second tubular.

13. The method of claim 12, wherein the at least one tooth embeds into the interface surface while rotating the key further in the first direction.

14. The method of claim 12, wherein rotating the key further in the first direction causes a portion of the perimeter of the key to engage a lateral surface of the recess.

15. The method of claim 12, further comprising inserting a loading element in the recess adjacent the key in interfering contact with the perimeter of the key, and the step of rotating the key to a set position occurs by rotating the loading element about a loading element axis in a second direction.

16. The method of claim 12, wherein said at least one tooth comprises a row of teeth, with a first tooth in the row being closer to the key axis than a last tooth in the row.

17. The method of claim 12, wherein:
the recess has a flat edge portion that faces generally toward the interface surface of the second tubular;
the perimeter of the key has a flat portion; and the method further comprises:
prior to rotating the key in the first direction, rotating the key in a second direction until the flat portion of the perimeter of the key abuts the flat edge portion of the recess.

18. A threaded connection between first and second tubulars comprising:
the first and second tubulars having mating threads that engage each other and interface surfaces that abut each other when the connection is made up, the interface surfaces being in a plane perpendicular to a threaded connection axis of the threaded connection;
a recess in an outer surface at the interface surface of the first tubular;
a key having a bore with a key axis, the key having a perimeter with a varying radius from the key axis, the perimeter of the key having a locking surface with at least one tooth that is farther from the key axis than a distance from the interface surface of the second tubular to the key axis when the first and second tubulars are made up;
a fastener extending in a direction that is generally radial with the threaded connection axis, through the bore into a receptacle in a base of the recess, the key being rotatable around the fastener from an unlocked position to a set position;
the unlocked position allowing rotation of the tubulars relative to each other in a coupling direction; and
the locking surface of the key being urged into gripping contact with the interface surface of the second tubular when the key is in a set position, and so that when at least a one of the first and second tubulars rotates in a decoupling direction, the gripping contact between the locking surface and the interface surface of the second tubular further rotates the key from the set position into a locked configuration that generates a force to oppose decoupling of the first and second tubulars.

19. The anti-rotation system of claim 18, wherein said at least one tooth comprises a plurality of teeth.

20. The anti-rotation system of claim 18, wherein said at least one tooth comprises a row of teeth, with a first tooth in the row being closer to the bore axis than a last tooth in the row.

* * * * *